(12) United States Patent
Sakurai et al.

(10) Patent No.: US 9,105,980 B2
(45) Date of Patent: Aug. 11, 2015

(54) RADIO COMMUNICATION APPARATUS

(75) Inventors: Masanori Sakurai, Tokyo (JP); Naoki Kobayashi, Tokyo (JP); Noriaki Ando, Tokyo (JP); Hiroshi Toyao, Tokyo (JP); Masaharu Imazato, Tokyo (JP)

(73) Assignee: LENOVO INNOVATIONS LIMITED (HONG KONG), Quarry Bay (HK)

( * ) Notice: Subject to any disclaimer, the term of this patent is extended or adjusted under 35 U.S.C. 154(b) by 350 days.

(21) Appl. No.: 13/576,466

(22) PCT Filed: Mar. 4, 2011

(86) PCT No.: PCT/JP2011/001281
§ 371 (c)(1),
(2), (4) Date: Aug. 1, 2012

(87) PCT Pub. No.: WO2011/121893
PCT Pub. Date: Oct. 6, 2011

(65) Prior Publication Data
US 2012/0299787 A1  Nov. 29, 2012

(30) Foreign Application Priority Data
Mar. 31, 2010  (JP) .................................. 2010-081456

(51) Int. Cl.
*H01Q 1/24* (2006.01)
*H01Q 1/38* (2006.01)
(Continued)

(52) U.S. Cl.
CPC ........... *H01Q 15/0086* (2013.01); *H01Q 1/243* (2013.01); *H01Q 15/14* (2013.01); *H04M 1/0237* (2013.01)

(58) Field of Classification Search
CPC . H01Q 15/0086; H01Q 1/243; H04M 1/0235; H04M 1/0237; H04M 1/0239; H04B 1/3838; H04B 1/0237

USPC .................................................. 343/749, 702
See application file for complete search history.

(56) References Cited

U.S. PATENT DOCUMENTS 5,786,979 A * 7/1998 Douglass ...................... 361/328
8,405,558 B2   3/2013 Hikino
(Continued)

FOREIGN PATENT DOCUMENTS

CN       101459274       6/2009
JP     2006-197292 A     7/2006
(Continued)

OTHER PUBLICATIONS

Ando WO 2010029770 Machine Translation.*
(Continued)

*Primary Examiner* — Dameon E Levi
*Assistant Examiner* — Ricardo Magallanes

(57) ABSTRACT

A radio communication apparatus (100) includes an antenna device (40) that faces at least a part of a conductor plate of a conductor surface (second casing) or a conductor layer of an interconnect substrate (30); and a plurality of conductor components (36) that are located between the antenna device (40) and the conductor surface and are arranged in a repetitive manner so as to intersect in a surface-normal direction of the conductor surface. The radio communication apparatus is, for example, a slide opening and closing type cellular phone and includes a first casing (10), a second casing (20), and a flexible interconnect substrate (30). The first casing (10) and the second casing (20) are slid relatively so that the radio communication apparatus (100) is switched between first and second states. In the first state, the interconnect substrate (30) is folded. The interconnect substrate (30) is extended further in the second state than in the first state.

15 Claims, 9 Drawing Sheets

(51) Int. Cl.
*H01Q 19/10* (2006.01)
*H05K 1/14* (2006.01)
*H01Q 15/00* (2006.01)
*H01Q 15/14* (2006.01)
*H04M 1/02* (2006.01)

(56) References Cited

U.S. PATENT DOCUMENTS

| | | |
|---|---|---|
| 8,514,147 B2 | 8/2013 | Konishi et al. |
| 2007/0243913 A1* | 10/2007 | Collins ............... 455/575.4 |
| 2009/0295660 A1* | 12/2009 | Xu et al. ................ 343/753 |
| 2011/0134010 A1* | 6/2011 | Toyao et al. ............ 343/844 |
| 2011/0156963 A1* | 6/2011 | Rajgopal et al. ........ 343/702 |
| 2011/0168788 A1* | 7/2011 | Sonoda et al. .......... 235/492 |
| 2011/0170267 A1* | 7/2011 | Ando ...................... 361/748 |

FOREIGN PATENT DOCUMENTS

| | | |
|---|---|---|
| JP | 2009-194689 A | 8/2009 |
| WO | WO 2010/013810 A1 | 2/2010 |
| WO | WO 2010013496 A1 * | 2/2010 |
| WO | WO 2010013810 A1 * | 2/2010 |
| WO | WO 2010029770 A1 * | 3/2010 |

OTHER PUBLICATIONS

Toyao WO 2010013496 Machine Translation.*
Chinese Office Action issued for corresponding application CN 201180015698.9, dated Jan. 8, 2014 (English translation attached).
Dong-Uk Sim et al.; "Design of NOvel Dipole-Type Tag Antennas using Electromagnetic Bandgap (EBG) Surface for Passive RFID Applications"; Antennas and Propagation International Symposium, 2007 IEEE Jun. 9-15, 2007, pp. 1333-1336.

* cited by examiner (a)

(b)

(a)

(b)

(a)

(b)

(a)

(b)

(a)

(b)

(a)

(b)

RADIO COMMUNICATION APPARATUS

TECHNICAL FIELD

The present invention relates to a radio communication apparatus.

BACKGROUND ART

In recent years, in terms of an increase in the size of a liquid crystal display screen and an improvement of operability, radio communication apparatuses such as cellular phones in which a display-side casing including a display screen and an operation-side casing including operation keys are slid relatively so that the radio communication apparatuses are opened and closed have been increasing.

There are known slide-type radio communication apparatuses in which antenna characteristics may deteriorate depending on a positional relation between a display-side casing and an operation-side casing. Accordingly, various technologies have been developed to maintain desired antenna characteristics.

As such a kind of technology, a portable radio terminal apparatus described below is disclosed in Patent Document 1 (Japanese Laid-open patent publication NO. 2006-197292). In the portable radio terminal apparatus, a short stub is provided in a space between an upper ground included in a display-side casing and a lower ground included in an operation-side casing. Since the short stub is coupled with the upper ground that has an adverse effect on an antenna device when the portable ratio terminal apparatus is opened in a slide manner, the deterioration in the antenna characteristics can be reduced.

RELATED DOCUMENT

Patent Document

[Patent Document 1] Japanese Laid-open patent publication NO. 2006-197292

DISCLOSURE OF THE INVENTION

In the technology disclosed in Patent Document 1, however, the casing has to have the short stub of about 50 mm therein. In portable radio terminal apparatuses having a tendency to be miniaturized and compressed, the addition of a member of this size may cause a considerable design problem.

The invention is devised in light of the above-mentioned circumstances and an object of the invention is to provide a radio communication apparatus capable of easily preventing deterioration in antenna characteristics caused by a conductor surface facing an antenna device.

In one embodiment, there is provided a radio communication apparatus including: an antenna device that faces at least a part of a conductor surface which a casing or a substrate has; and a plurality of conductor components that are arranged in a repetitive manner between the antenna device and the conductor surface so as to intersect in a surface-normal direction of the conductor surface.

According to the embodiment, it is possible to provide the radio communication apparatus capable of preventing easily deterioration in antenna characteristics caused by the conductor surface facing the antenna device.

BRIEF DESCRIPTION OF THE DRAWINGS

The above-described object, other objects, characteristics, and advantages are apparent in the description of a preferred embodiment and the drawings accompanying in the embodiment.

DESCRIPTION OF EMBODIMENTS

Figure 1:
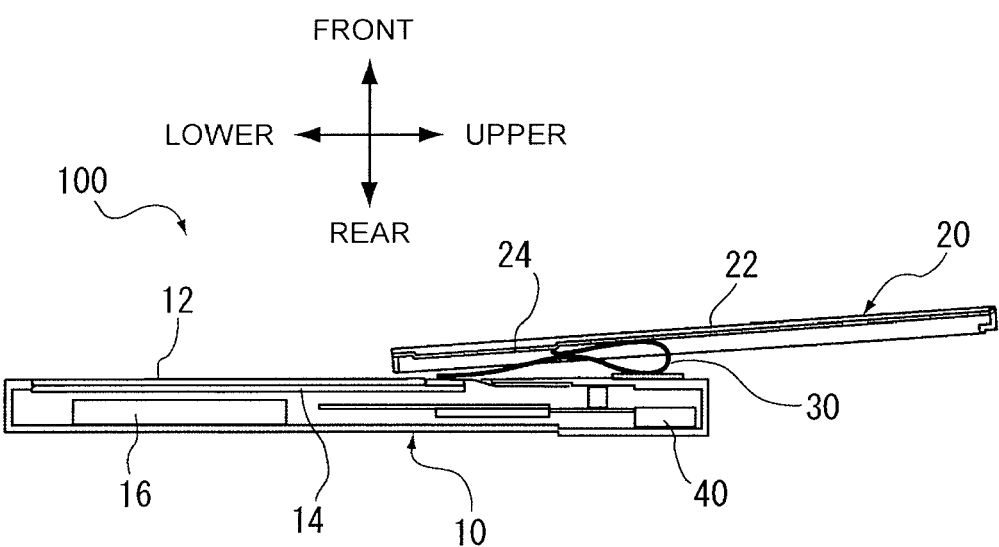
FIG. 1 is a longitudinal sectional view schematically illustrating a radio communication apparatus according to an embodiment of the present invention.
Figure 1:
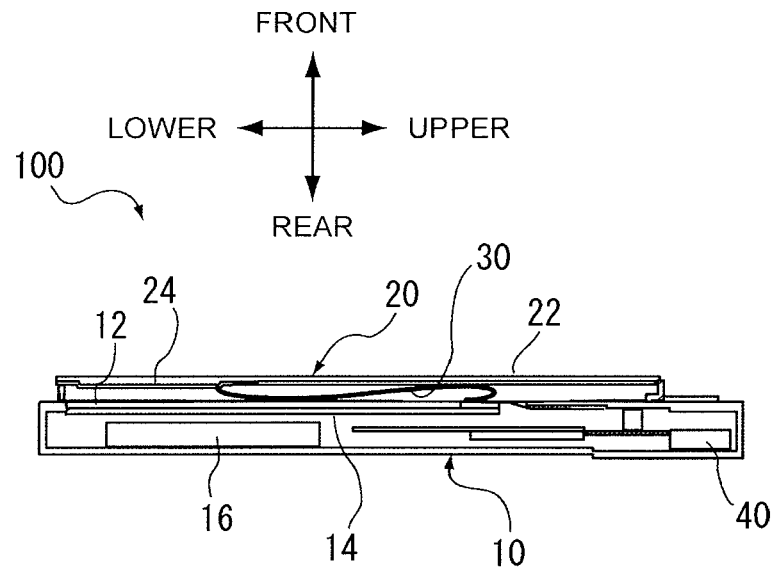

Hereinafter, an embodiment of the invention will be described with reference to the drawings. Through the drawings, the same reference numerals are given to the same constituent elements and the description thereof will not be repeated.

FIGS. 1($a$) and 1($b$) are longitudinal sectional views schematically illustrating a radio communication apparatus 100 according to the embodiment of the present invention.

First, the overview of the radio communication apparatus 100 will be described.

The radio communication apparatus 100 includes a first casing 10, a second casing 20, and a flexible interconnect substrate 30. For example, the second casing 20 is slid relative to the first casing 10. The interconnect substrate 30 interconnects the first casing 10 and the second casing 20.

The radio communication apparatus 100 can be switched between first and second states described below by sliding the first casing 10 and the second casing 20 relative to each other. In the first state, the interconnect substrate 30 is folded. The interconnect substrate 30 is extended further in the second state than in the first state.

The first casing 10 accommodates an antenna device in an end portion of the first casing 10 so that communication quality of the radio communication apparatus 100 does not deteriorate when a user holds the radio communication apparatus 100 with his or her hand. The second casing 20 accommodates at least a part of the interconnect substrate 30.

Hereinafter, this embodiment will be described in detail.

The radio communication apparatus 100 is, for example, a slide opening and closing type cellular phone.

The first casing 10 is an operation-side casing which the user holds his or her hand to operate a key. The first casing 10 includes an operation key 12, a first circuit substrate 14, a power source 16, and an antenna device 40. The operation key 12, the power source 16, and the antenna device 40 are electrically connected to the first circuit substrate 14.

The operation key 12 is an input interface on which the user performs an input operation with his or her finger or the like.

The first circuit substrate 14 is a so-called rigid substrate and controls the radio communication apparatus 100. The antenna device 40 transmits and receives a radio wave with a predetermined communication frequency. The power source 16 supplies power to the radio communication apparatus 100.

The second casing 20 is a display-side casing that includes a display panel 22 and a second circuit substrate 24.

The second circuit substrate 24 is a so-called rigid substrate. The second circuit substrate 24 receives a signal from the first circuit substrate 14 through the interconnect substrate 30 and controls the display panel 22. The display panel 22 is a display that outputs various kinds of displays.

The interconnect substrate 30 is a so-called flexible substrate (FPC).

Signals with various operation frequencies of the radio communication apparatus 100 are transmitted through the interconnect substrate 30 between the first circuit substrate 14 and the second circuit substrate 24. The radio communication apparatus 100 may have a plurality of operation frequencies. Examples of the operation frequency include a clock frequency of a device mounted on the first circuit substrate 14 or the second circuit substrate 24 and a communication frequency of the antenna device 40.

Examples of the communication frequency of the antenna device 40 include not only a call or communication frequency band of a cellular phone or a radio communication system but also a frequency band of a positioning system or a digital television. Specifically, examples of the communication frequency include not only an 800 MHz band, a 1.5 GHz band, and a 2 GHz band designed only for a mobile communication system but also a 2.4 GHz band and a 5 GHz band designed for a radio local area network (LAN).

In this embodiment, as shown in FIG. 1, the upper and lower directions of a sheet surface corresponding to a surface-normal direction of the operation key 12 of the first casing 10 are defined as front and rear directions, and the right and left directions of the sheet surface corresponding to the longitudinal direction of the radio communication apparatus 100 are defined as upper and lower directions. The defined directions are directions used to facilitate the description of the relative relation of constituent elements, and do not limit the directions used to manufacture or use the radio communication apparatus 100.

The first casing 10 and the second casing 20 are slid relative to each other by sliding mechanisms (not shown) extending in the upper and lower directions to be opened and closed. Hereinafter, the first casing 10 is assumed to be a fixed side and the second casing 20 is assumed to be a slid side to facilitate the description. However, it is not necessary to fix one of these casings with respect to a user or a space. These casings may be slid in an opposite direction to each other.

FIG. 1(a) is a diagram illustrating an opened state in which the second casing 20 is slid upward and the operation key 12 is then exposed. FIG. 1(b) is a diagram illustrating a closed state in which the second casing 20 is slid downward and the operation key 12 is then covered.

The surface-normal direction of the display panel 22 of the second casing 20 in the opened state is slightly inclined with respect to the front and rear directions of the radio communication apparatus 100. That is, the second casing 20 switched between the opened state and the closed state is slid in the upper and lower directions and is slightly rotated in a width direction (the front and rear directions of the sheet surface in FIG. 1). In this embodiment, the sliding of the second casing 20 includes translation movement of the second casing 20 with respect to the first casing 10 in a straight manner or a curved manner and rotation movement of the second casing 20 with respect to the first casing 10. Instead, the second casing 20 may be slid to be opened or closed in a straight manner without inclination of the second casing 20 with respect to the first casing 10 in a state in which the surface-normal directions of these casings coincide with each other.

Figure 2:
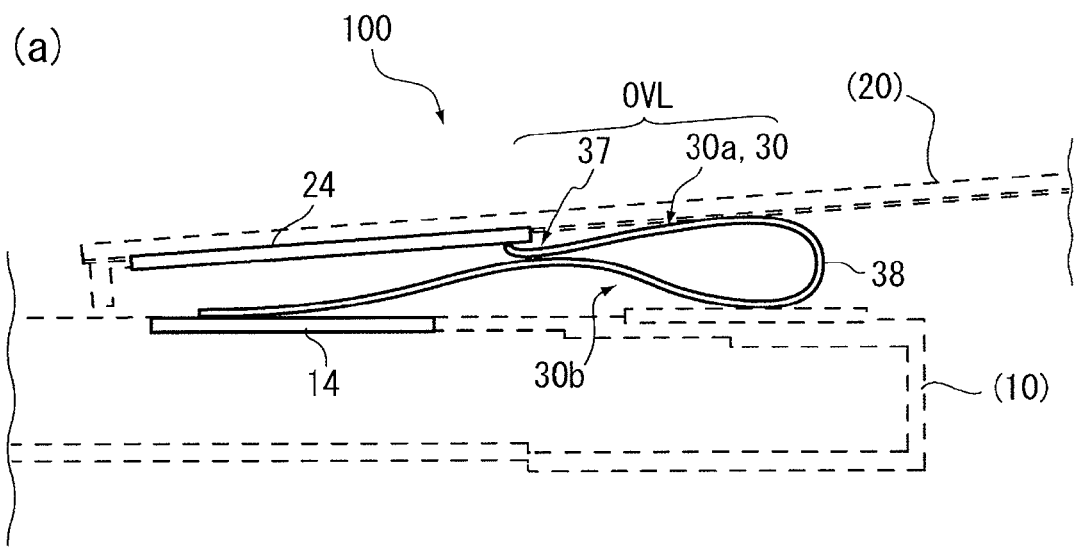
FIG. 2($a$) is a partial schematic view illustrating a first circuit substrate, a second circuit substrate, and an interconnect substrate in an opened state and FIG. 2($b$) is a partial schematic view illustrating the first circuit substrate, the second circuit substrate, and the interconnect substrate in a closed state.
Figure 2:
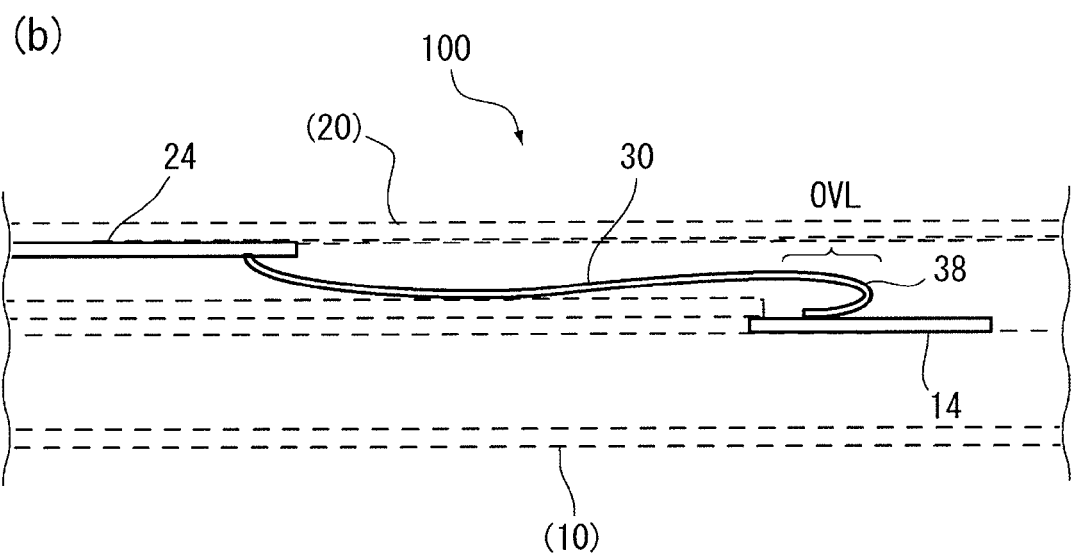

FIG. 2(a) is a partial schematic view illustrating the first circuit substrate 14, the second circuit substrate 24, and the interconnect substrate 30 in the opened state of FIG. 1(a). Likewise, FIG. 2(b) is a partial schematic view illustrating the first circuit substrate 14, the second circuit substrate 24, and the interconnect substrate 30 in the closed state of FIG. 1(b). In FIG. 2, the first casing 10 and the second casing 20 are indicated by dashed lines.

The interconnect substrate 30 shown in FIG. 2(a) is entirely folded. This state corresponds to the first state. Connectors (not shown) are installed to be fitted to each other at both ends of the first circuit substrate 14, the second circuit substrate 24, and the interconnect substrate 30. The end portions of the interconnect substrate 30 are fixed to the first circuit substrate 14 and the second circuit substrate 24 in any direction.

An overlapping region OVL of the folded interconnect substrate 30 is accommodated in the second casing 20. Here, a space for accommodating the overlapping region OVL is restricted due to the dimensional constraint of the second casing 20. Since the interconnect substrate 30 has a property for maintaining a predetermined shape due to folding rigidity, the interconnect substrate 30 and the second casing 20 come into close contact with each other, and the very interconnect substrate 30 comes into close contact with each other. Therefore, in the interconnect substrate 30, as shown in FIG. 2(a), a neck portion 37 in which a facing gap of the interconnect substrate 30 is small is formed. A half-folded portion 38 of the folded interconnect substrate 30 is formed in an arc shape, so that the entire interconnect substrate 30 is formed in a substantial Ω shape. The shape of the interconnect substrate 30 in the first state has high repeatability. Therefore, whenever the second casing 20 is slid so that the radio communication apparatus 100 enters the opened state, the predetermined facing gap (surface-normal distance) of the interconnect substrate 30 in the neck portion 37 is formed repeatedly.

The overlapping region OVL of the interconnect substrate 30 refers to a region at which the interconnect substrate 30 overlaps with each other in the form of a plurality of sheets, when the interconnect substrate 30 is seen from the surface-normal direction of at least one of the first casing 10 and the second casing 20.

The neck portion 37 refers to a region at which the facing gap of the interconnect substrate 30 is the minimum inside the overlapping region OVL in the first state except for the vicinity of the half-folded portion 38. The neck portion 37 is a region at which a predetermined expanse is present. Further, in the neck portion 37, the very interconnect substrate 30 may come into contact with each other (the facing gap=0) or may be separated from each other (the facing gap≠0).

In the interconnect substrate 30, a length section corresponding to the front surface side of the overlapping region OVL is referred to as a front surface section 30a and a length section corresponding to the rear surface side of the overlapping region OVL is referred to as a rear surface section 30b.

A current flowing in the interconnect substrate 30 from the first casing 10 to the second casing 20 (and vice versa) is a reverse-phase current in an opposite direction between the front surface section 30a and the rear surface section 30b.

On the other hand, when the second casing 20 is switched from the opened state (FIG. 1(a)) to the closed state (FIG. 1(b)), the interconnect substrate 30 is drawn downward together with the second casing 20 to be entirely extended (see FIG. 2(b)). This state corresponds to the second state. The area of the overlapping region OVL of the folded interconnect substrate 30 in the first state is greater than the area of the overlapping region OVL in the second state. In this embodiment, the neck portion 37 of the interconnect substrate 30 in the second state is not present.

Here, as shown in FIG. 1, the antenna device 40 faces the first casing 10, the second casing 20, the interconnect substrate 30, the first circuit substrate 14, the second circuit substrate 24, and the like.

The fact that the antenna device 40 faces means that when the antenna device 40 and a target member (region) are bound in a straight line, the surface direction of the target member intersects this straight line.

When the radio communication apparatus 100 is in the first state, as shown in FIG. 1(a), the second circuit substrate 24 is located in the rear of the interconnect substrate 30 when viewed from the antenna device 40. When the radio communication apparatus 100 is in the second state, as shown in FIG. 1(b), the second circuit substrate 24 is also located in the rear of the interconnect substrate 30 when viewed from the antenna device 40.

The fact that the second circuit substrate 24 is located in the rear of the interconnect substrate 30 when viewed from the antenna device 40 means that the antenna device 40 faces the interconnect substrate 30 with the second circuit substrate 24 interposed therebetween.

In regard to the above-described members, when each member facing the antenna device 40 has at least a part of a conductor surface, the electromagnetic wave emitted from the antenna device 40 is subjected to reverse phase reflection from this conductor surface. In this case, when the distance between the antenna device 40 and the conductor surface can be set to $\lambda/4$ (where $\lambda$ is the wavelength of the electromagnetic wave emitted from the antenna device 40), the antenna characteristics do not deteriorate. However, in a small-sized radio communication device such as the radio communication apparatus 100, it is difficult to ensure $\lambda/4$ as the distance between the antenna device 40 and the conductor surface of each member. Accordingly, the antenna characteristics (the radiation efficiency of an antenna) deteriorate due to the conductor surface of each member.

In particular, when the radio communication apparatus 100 is in the first state, it is difficult to avoid facing a conductor layer (conductor surface) included in the interconnect substrate 30, and thus the conductor layer degrades the antenna characteristics of the antenna device 40.

In order to reduce such an adverse effect, a plurality of conductor components 36 (see FIGS. 3, 4, and 5 to be described below) are arranged in a repetitive manner between the antenna device 40 and this conductor surface so as to intersect in the surface-normal direction of the conductor surface.

In this embodiment, the second casing 20 includes a conductor plate 21 and the interconnect substrate 30 includes conductor layers 34a and 34b (see FIGS. 3 and 5 to be described below), each of which is regarded as a conductor surface. The plurality of conductor components 36 are electrically connected to the conductor surfaces (the conductor plate 21 and the conductor layer 34a) and form a left-handed metamaterial together with the electrically connected conductor surfaces. Here, the left-handed metamaterial refers to an artificial substance that has a negative dielectric constant, negative magnetic permeability, and a negative refractive index.

The left-handed metamaterial has characteristics of reflecting an electromagnetic wave reflected with the same phase. Accordingly, a region in which the plurality of conductor components 36 are arranged can function as a reflection plate that reflects an electromagnetic wave emitted from the antenna device 40 with the same phase. When this region functions as the reflection plate that reflects the electromagnetic wave with the same phase, the radiation efficiency of the antenna device 40 improves as the conductor components 36 are disposed at a distance close to the antenna device 40.

Further, the left-handed metamaterial can be produced so as to have the characteristics of a so-called electromagnetic band-gap (EBG). At this time, the region in which the plurality of conductor components 36 are arranged can attenuate the electromagnetic wave with the operation frequency of the radio communication apparatus 100. In this embodiment, the left-handed metamaterial having the characteristics of the electromagnetic band-gap is realized in the region in which the plurality of conductor components 36 are arranged.

Here, the conductor surface is a region in which a material with conductivity extends and also includes a metal casing, a conductor layer of substrate, and the like.

The fact that the conductor components 36 are arranged in the repetitive manner so as to intersect in the surface-normal direction of the conductor surface means that the surface direction of each conductor component 36 is not perpendicular to the surface direction of the conductor surface and the surfaces of the conductor components 36 are arranged at a distance so as not to face each other.

The center-to-center distance of the adjacent conductor components 36 is preferably less than half of the wavelength $\lambda$ of the electromagnetic wave of a communication frequency (or one of a plurality of communication frequencies) of the antenna device 40.

Further, the conductor components 36 are preferably arranged in the surface direction of the conductor surface so that the distances between the conductor surface and the conductor components 36 are uniform, but the invention is not limited thereto. That is, the distances between the conductor surface and the conductor components 36 may be varied individually within the range in which the region functions as a left-handed metamaterial at the communication frequency of the antenna device 40.

(Arrangement of Conductor Components)

Hereinafter, the arrangement of the conductor components 36 will be described with reference to the drawings.

Figure 3:
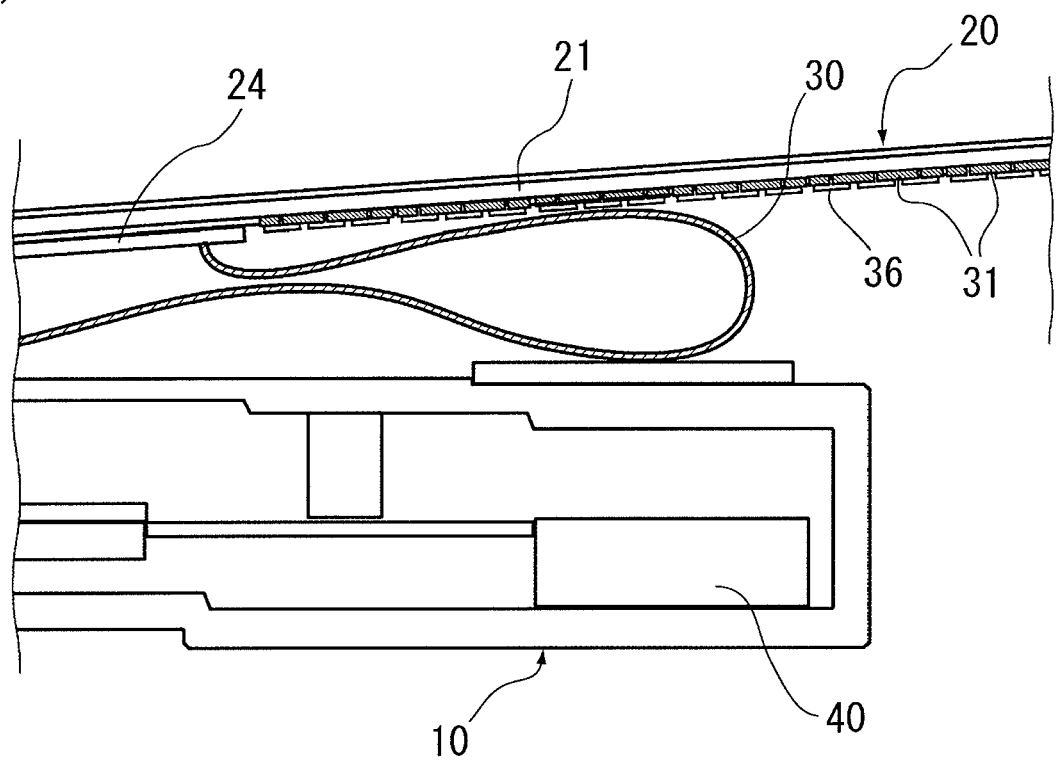
FIG. 3($a$) is a partial schematic view illustrating the periphery of an antenna device in the opened state and FIG. 3($b$) is a partial schematic view illustrating conductor components arranged in a repetitive manner.
Figure 3:
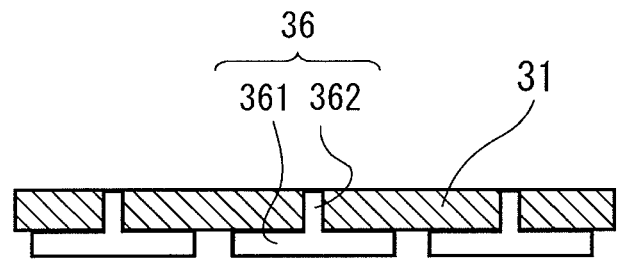

FIG. 3(a) is a partial schematic view illustrating the periphery of the antenna device 40 in the opened state of FIG. 1(a). FIG. 3(b) is a partial schematic view illustrating the conductor components 36 arranged in the repetitive manner. In FIG. 3, the conductor component 36 is formed in a mushroom shape, but this mushroom shape is merely an example. The specific examples of the structure of the suitably used conductor component 36 will be described later.

The inside of the second casing 20 shown in FIG. 3(a) is the conductor plate 21. A coating material is coated on the surface of the conductor plate 21. The conductor components 36 are located between the conductor plate 21 and the antenna device 40 and are arranged in the surface direction of the conductor plate 21. Each conductor component 36 is electrically connected to the conductor plate 21, and thus a left-handed metamaterial is formed by the plurality of conductor components 36 and the conductor plate 21.

As shown in FIG. 3(b), the conductor component 36 includes a conductor element 361 formed in a planar shape and a first connection member 362 formed in a columnar shape in a vertical direction of the surface of the conductor element 361. A space between the conductor element 361 and the conductor plate 21 facing the conductor element 361 is filled with a dielectric layers 31.

Here, the thickness of the dielectric layer 31 is set to correspond to the length of the first connection member 362, but the invention is not limited thereto. The dielectric layer 31 may cover the entire conductor component 36.

The positions of the conductor components 36 shown in FIG. 3(a) are merely exemplary positions, but the invention is not limited thereto. The conductor component 36 may be arranged at any regions including the region facing the antenna device 40.

Since the region at which the conductor components 36 are arranged can function as a reflection plate to the antenna device 40, this region has an influence on the directivity of the antenna device 40. Further, the region at which the conductor components 36 are allowed to be arranged is restricted due to the arrangement of the members included in the first casing 10 and the second casing 20. The conductor components 36 may appropriately be arranged in consideration of the restriction on the arrangement of the conductor components 36.

Figure 4:
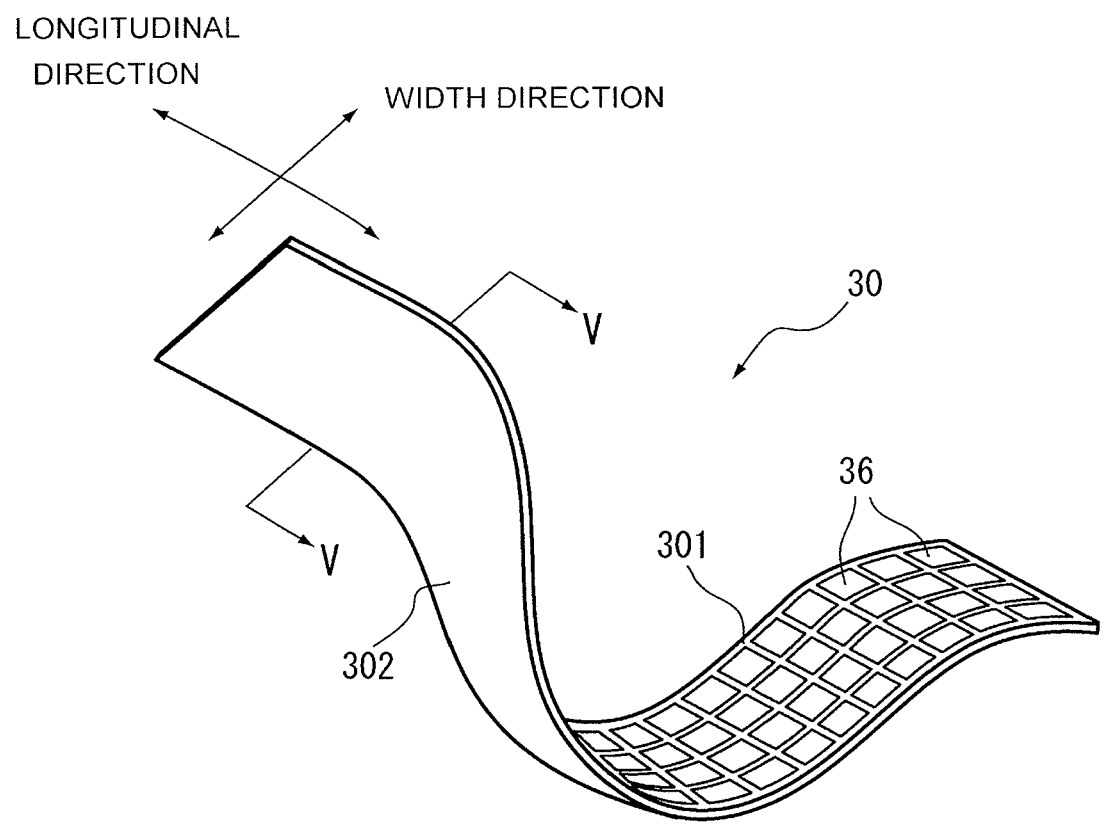
FIG. 4 is a perspective view schematically illustrating the interconnect substrate according to the embodiment.
Figure 5:
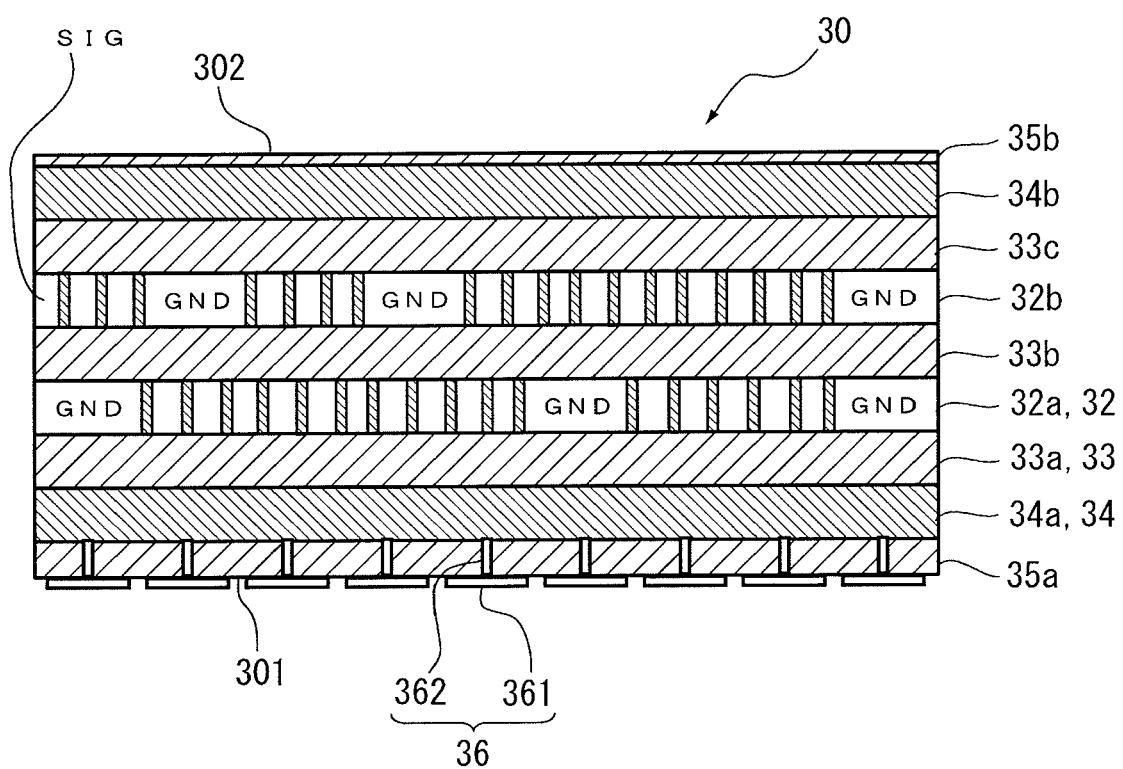
FIG. 5 is a sectional view taken along line V-V of FIG. 4.

FIG. 4 is a perspective view schematically illustrating the interconnect substrate 30 according to this embodiment. FIG. 5 is a sectional view taken along line V-V of FIG. 4. The interconnect substrate 30 includes not only interconnect layers 32 and the conductor layers 34 but also the conductor components 36 on at least one of the main surfaces thereof. The main surface on the installation side of the conductor components 36 is referred to as a front surface 301 and the opposite surface to the main surface is referred to as a rear surface 302. In FIG. 4, four conductor components 36 are illustrated in the width direction and the number, sizes, and positions of the conductor components 36 are merely examples. A part of the front surface 301 is hidden in FIG. 4. However, the description will be made below on the assumption that the conductor components 36 are arranged on the substantially entire front surface 301. However, the conductor components 36 may be arranged partially on the front surface 301 of the interconnect substrate 30 or may be arranged on both the front surface 301 and the rear surface 302.

The interconnect layer 32 shown in FIG. 5 is a layer in which several signal lines SIG through which a signal of the operation frequency is transmitted and received between the first circuit substrate 14 and the second circuit substrate 24 (see FIG. 1), grounds GND to which a constant potential such as a ground potential is given, and power interconnects (not shown) are formed in a pattern. The signal lines SIG are insulated from each other and the signals lines SIG and the grounds GND are insulated from each other. The interconnect layer 32 can be formed by chemical etching of copper coating. The interconnect substrate 30 includes one interconnect layer 32 or two or more interconnect layers 32. In FIG. 4, the interconnect substrate 30 including two interconnect layers 32a and 32b is exemplified.

The conductor layers 34 (34a and 34b) are shield layers made of a metal material such as copper and are laminated on the upper and lower sides of the interconnect layer 32. One of the conductor layers 34a and 34b is grounded and both the conductors 34a and 34b are electrically connected to each other by a via (not shown). The conductor layers 34 are each formed on the substantially entire surface of the interconnect substrate 30 within the conductor layers 34, but regions at which no conductor layer is formed may be allowed to be present locally.

Insulation layers 33 (33a, 33b, and 33c) are laminated between the conductor layers 34 and the interconnect layers 32 and between the interconnect layers 32, respectively. The insulation layers 33 can be formed by coating an insulation resin material. Insulation coat layers 35a and 35b are further laminated on the outsides of the conductor layer 34, respectively.

When the conductor elements 361 are exposed from the coat layer 35a, an insulation coat layer (not shown) coating the conductor elements 361 may be further formed on the front surface 301 of the interconnect substrate 30. Hereinafter, the thickness of the coat layer is assumed to be included in the thickness of the coat layer 35a to facilitate the description.

The conductor components 36 are laminated on the front surface 301 of the conductor layer 34. In this embodiment, the so-called mushroom-shaped conductor component 36 including the conductor element 361 formed in the planar shape along the conductor layer 34 and the first connection member 362 extending in the surface-normal direction of the interconnect substrate 30 and connecting the conductor element 361 to the conductor layer 34a is exemplified. As will be described later, various shapes of the conductor component 36 may be used. The first connection member 362 is a columnar via formed through the coat layer 35a.

Each conductor component 36 is electrically connected to the conductor layer 34a via the first connection member 362, and thus a left-handed metamaterial is formed by the plurality of conductor components 36 and the conductor layer 34a.

The conductor components 36 are arranged in the surface direction of the conductor layer 34a. In this embodiment, when the radio communication apparatus 100 is in the first state, the interconnect substrate 30 is installed so that the front surface 301 faces the side of the antenna device 40 (see FIG. 2(a)) in the rear surface section 30b of the overlapping region OVL. In this case, the conductor components 36 arranged in the front surface section 30a of the overlapping region OVL are located on the side of the first casing 10, when viewed from the conductor layers 34 (34a and 34b). Further, the other conductor components 36 are located on the side of the antenna device 40, when viewed from the conductor layers 34 (34a and 34b).

The positions of the conductor components 36 shown in FIGS. 4 and 5 are merely exemplary positions, but the invention is not limited thereto. The conductor components 36 may be arranged at any regions including at least the rear surface section 30b of the overlapping region OVL facing the antenna device 40. However, the further plurality of conductor components 36 are more preferably arranged even in a region (see FIG. 3a) which is a region on the interconnect substrate 30 and is located between the antenna device 40 and the second circuit substrate 24.

As described above, the conductor components 36 may appropriately be arranged in consideration of the directivity of the antenna device 40, the arrangement of each member, and the like.

Here, the case in which the radio communication apparatus 100 is in the first state has been described. The region at which the conductor components 36 are arranged on the interconnect substrate 30 preferably faces the antenna device 40 in both first and second states. Accordingly, the plurality of conductor components 36 may be arranged on both surfaces (the front surface 301 and the rear surface 302) of the interconnect substrate 30.

Structure of Conductor Component

Hereinafter, the structure of the conductor components 36 will be described in detail with reference to the drawings according to this embodiment.

The common characteristics of the conductor components 36 forming the left-handed metamaterial according to this embodiment are that a first capacitance formed by the conductor surface (the conductor plate 21 or the conductor layer 34a) and the conductor element 361 facing each other and an inductance element connected in series to the first capacitance are included.

Here, a cell structured by the first capacitance, which is formed by the single conductor element 361 and the conductor surface of the region facing this conductor element 361, and the inductance element connected in series to the first capacitance is defined as a unit cell 50.

In this embodiment, the unit cells 50 (the conductor components 36) are arranged in a repetitive manner along the conductor surface (the conductor plate 21 or the conductor layer 34a). The arrangement pattern of the unit cells 50 is not limited. For example, the unit cells 50 may be preferably arranged in a periodic manner.

The "repetitive" arrangement also includes a case in which some of the constituent elements of the unit cells 50 are missed. When the unit cells 50 are arranged two-dimensionally as in this embodiment, the "repetitive" arrangement also includes a case in which the unit cells 50 may be partially missed. Further, the "periodic" arrangement also includes a case in which some of the constituent elements of some unit cells 50 are deviated and a case in which the very arrangement of some unit cells 50 is deviated. That is, even when the periodicity is not realized in a strict sense but the unit cells 50 are arranged in the repetitive manner, the characteristics of the metamaterial can be obtained. Therefore, the "periodicity" is allowed to be defective to some extent.

The cause that such defect occurs includes a manufacturing cause to form an interconnect, a via or the first connection member 362 between the unit cells 50. In addition, for example, when a metamaterial structure is added to the existing interconnect layout or the connections structure between substrates, it may be difficult to arrange the unit cells due to the existing via, pattern or the first connection member, a manufacturing error may be considered, or the existing via, pattern or the first connection member are used as part of the unit cell.

The unit cell 50 formed by the conductor component 36 and the conductor surface (the conductor plate 21 or the conductor layer 34a) shown in FIG. 3 or 5 is a so-called mushroom-shaped metamaterial. Specifically, the conductor element 361 of the conductor component 36 corresponds to a head portion of the mushroom and the first connection member 362 corresponds to an inductance portion of the mushroom.

Figure 6:
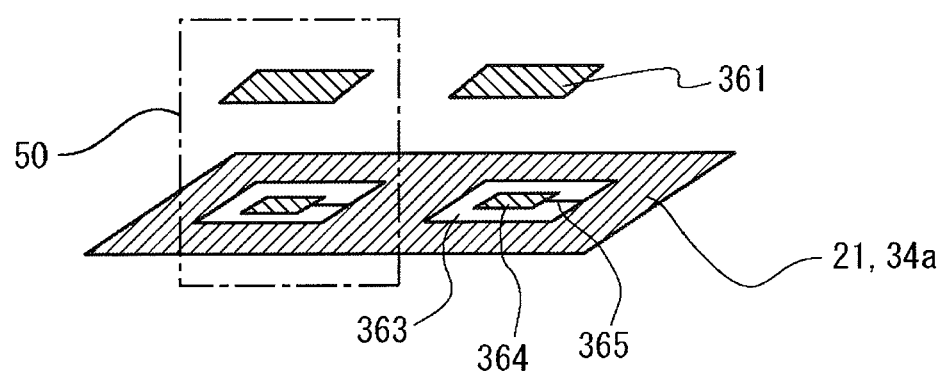
FIG. 6($a$) is a perspective view schematically illustrating a first example of a unit cell and FIG. 6($b$) is an equivalent circuit diagram illustrating the unit cell.
Figure 6:
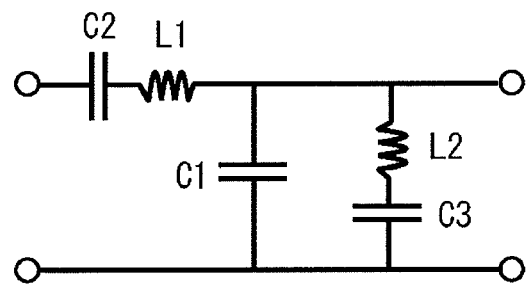

FIG. 6($a$) is a perspective view schematically illustrating a first example of the unit cell 50 and FIG. 6($b$) is an equivalent circuit diagram illustrating the unit cell 50. The unit cell 50 of the first example includes the patch-shaped conductor element 361 facing the conductor surface (the conductor plate 21 or the conductor layer 34a) outside the conductor surface, an opening 363 formed in the conductor surface, a conductor piece 364 formed in an island shape inside the opening 363, and an interconnect 365 interconnecting the conductor piece 364 and the conductor surface. The conductor piece 364 and the interconnect 365 are formed in the same layer as the conductor surface. The conductor component 36 according to this example includes the conductor element 361, the conductor piece 364, and the interconnect 365.

Capacitance C1 is formed between the conductor element 361 and the conductor surface. Further, capacitance C2 and inductance L1 are formed between the adjacent conductor elements 361. Furthermore, capacitance C3 is formed between the conductor element 361 and the conductor piece 364. The interconnect 365 has inductance L2.

Figure 7:
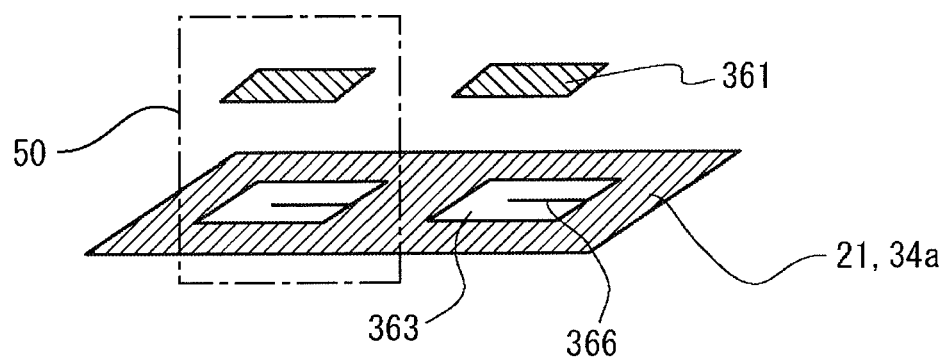
FIG. 7($a$) is a perspective view schematically illustrating a second example of the unit cell and FIG. 7($b$) is an equivalent circuit diagram illustrating the unit cell.
Figure 7:
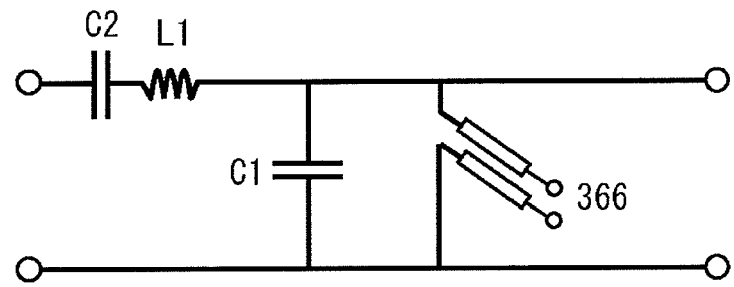

FIG. 7($a$) is a perspective view schematically illustrating a second example of the unit cell 50 and FIG. 7($b$) is an equivalent circuit diagram illustrating the unit cell 50. The unit cell 50 of the second example is different from the unit cell 50 of the first example in that the unit cell 50 is an open stub type unit cell that includes a line-shaped microstrip line 366 instead of the conductor piece 364 and the interconnect 365 shown in FIG. 6($a$). One end of the microstrip line 366 is connected to the conductor surface (the conductor plate 21 or the conductor layer 34a) and the other end of the microstrip line 366 is an open end. The conductor component 36 according to this example includes the conductor element 361 and the microstrip line 366.

Figure 8:
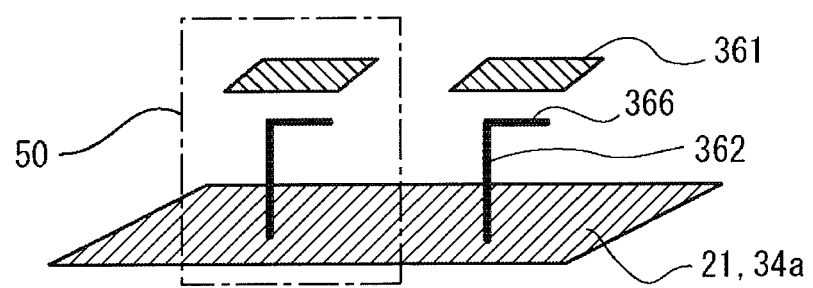
FIG. 8($a$) is a perspective view schematically illustrating a third example of the unit cell and FIG. 8($b$) is a perspective view schematically illustrating a fourth example of the unit cell.
Figure 8:
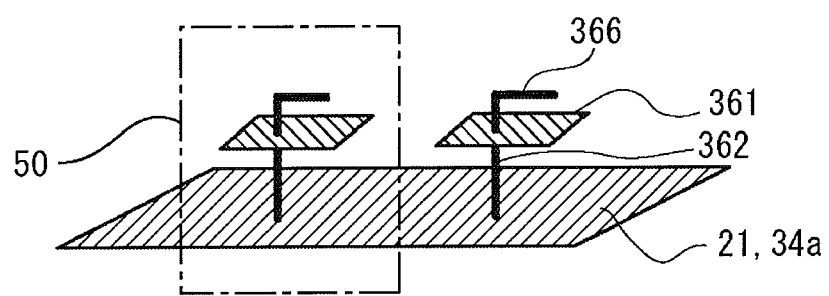

FIG. 8($a$) is a perspective view schematically illustrating a third example of the unit cell 50. The equivalent circuit diagram of the unit cell 50 of the third example is common to that of the second example (FIG. 7($b$)). The unit cell 50 of the third example is different from the unit cell 50 of the second example in that the microstrip line 366 is formed in a layer different from the conductor surface (the conductor plate 21 or the conductor layer 34a) and one end of the microstrip line 366 and the conductor surface are connected to the first connection member 362. The other end of the microstrip line 366 is an open end. Thus, the inductances of the microstrip line 366 and the first connection member 362 are connected in series to each other, and therefore high inductance can be obtained. The microstrip line 366 of the third example is formed in an intermediate layer of the conductor element 361 and the conductor surface. The conductor component 36 according to this example includes the conductor element 361, the microstrip line 366, and the first connection member 362.

FIG. 8($b$) is a perspective view schematically illustrating a fourth example of the unit cell 50. The equivalent circuit diagram of the unit cell 50 of the fourth example is common to that of the second example (FIG. 7($b$)). The unit cell 50 of the fourth example is different from the unit cell 50 of the third example in that the microstrip line 366 is located on the opposite side of the conductor surface (the conductor plate 21 or the conductor layer 34a) with the conductor element 361 interposed therebetween. That is, the first connection member 362 of the fourth example is formed through the conductor element 361 to connect one end of the microstrip line 366 to the conductor surface. Thus, the inductance of the first connection member 362 can be increased. The conductor component 36 according to this example likewise includes the conductor element 361, the microstrip line 366, and the first connection member 362.

Figure 9:
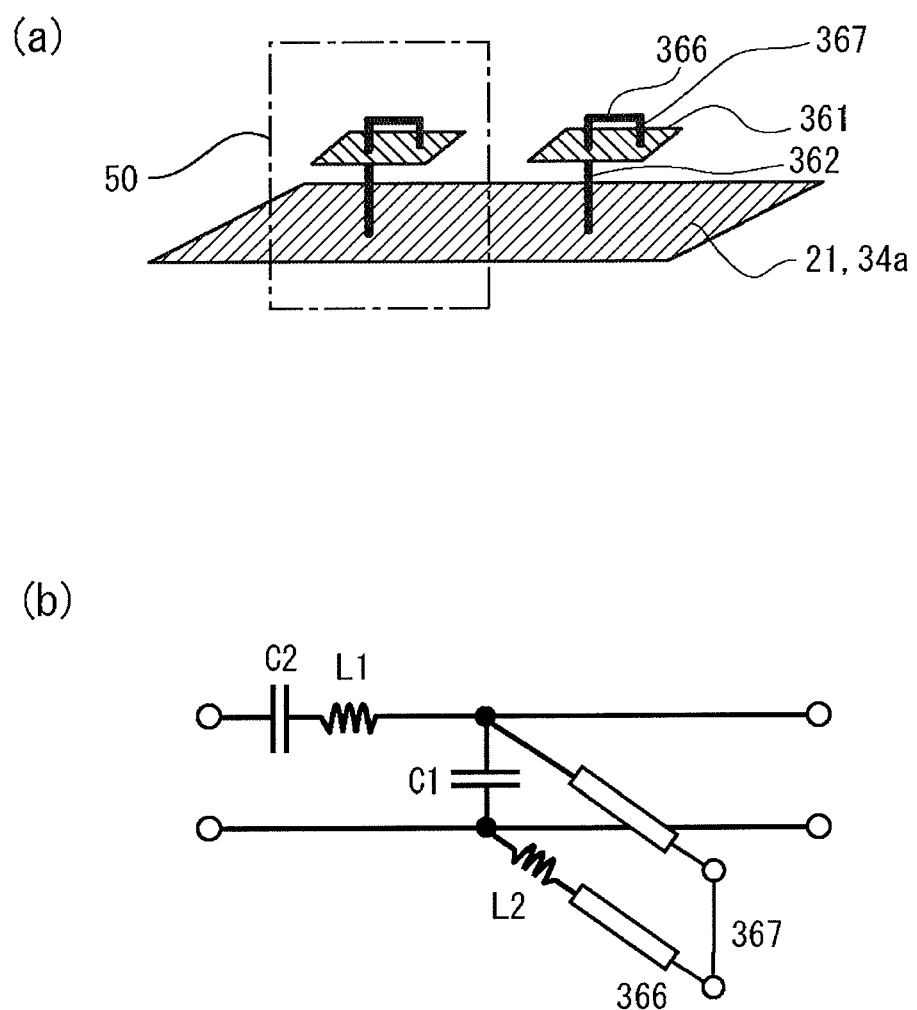
FIG. 9($a$) is a perspective view schematically illustrating a fifth example of the unit cell and FIG. 9($b$) is an equivalent circuit diagram illustrating the unit cell.

FIG. 9($a$) is a perspective view schematically illustrating a fifth example of the unit cell 50 and FIG. 9($b$) is an equivalent circuit diagram illustrating the unit cell 50. The unit cell 50 of the fifth example is different from the unit cell 50 of the fourth example in that the front end of the microstrip line 366 is not an open end and is short-circuited with the conductor element 361 by a second connection member 367. The unit cell 50 includes an impedance portion formed by inductance L1 and capacitance C2 and an admittance portion formed by the microstrip line 366, the second connection member 367, the capacitance C1, and the inductance L2. The conductor component 36 according to this example includes the conductor element 361, the microstrip line 366, the first connection member 362, and the second connection member 367.

In any unit cell 50 described above, the left-handed metamaterial can be formed with the dimension in which the width of the conductor element 361 is a few cm or a few mm and the distance between the conductor element 361 and the conductor surface (the conductor plate 21 or the conductor layer 34a) is a few mm or 1 mm or less. Further, the unit cell 50 shown in FIG. 8 or 9 is realized in three layers. However, since the unit cell 50 shown in FIG. 6 or 7 can be realized in two layers, the thinner left-handed metamaterial can be realized suitably.

Advantages of Embodiment

In this embodiment, the conductor surface (the conductor plate 21 or the conductor layer 34a) on which the plurality of conductor elements 36 are arranged reflects an electromagnetic wave radiated from the antenna device 40 with the same phase. The conductor surface is formed in the vicinity of the antenna device 40. Accordingly, the characteristics of the antenna device 40 can be prevented from deteriorating.

Since the plurality of conductor components 36 are arranged on the substantially entire front surface 301 of the interconnect substrate 30, the second circuit substrate 24 can be screened from the antenna device 40. Further, when the plurality of conductor components 36 are arranged on the substantially entire rear surface 302 of the interconnect substrate 30, the second circuit substrate 24 can be screened from the antenna device 40 even in the second state.

Therefore, it is possible to reduce the bad influence of the conductor plate 21, the conductor layers 34 (34a and 34b) of the interconnect substrate 30, and the conductor layer (not shown) of the second circuit substrate 24 on the antenna characteristics of the radio communication apparatus 100.

The fact that the substrate is screened from the antenna device 40 means a state in which at least part of an electromagnetic wave which is transmitted and received between the substrate and the antenna device 40 is reduced by another physical component.

In this embodiment, the conductor layer 34a in which the plurality of conductor components 36 are arranged has a function of attenuating propagated noise. Therefore, since high-frequency noise radiated from the first circuit substrate 14 or the second circuit substrate 24 is inhibited from propagating from the conductor layer 34b to the antenna device 40, and thus becoming the noise to the communication frequency, the communication quality of the radio communication apparatus 100 can be stabilized.

Since the conductor components 36 (the unit cell 50) according to this embodiment have a very small dimension and are simply arranged in the repetitive manner in a target region (conductor surface) so that the left-handed metamaterial is formed, the degree of freedom of layout is high and the conductor components 36 can be realized relatively easily.

The embodiment of the invention has been described with reference to the drawings, but is merely an exemplary embodiment of the invention. Other various configurations can be used. Of course, the above-described embodiment and plurality of exemplary embodiments can be combined within the scope as long as the contents do not conflict.

In the above-described embodiment, the slide opening and closing type radio communication apparatus 100 has been described, but a fold opening and closing type radio communication apparatus or a shape-fixed radio communication apparatus may be used. That is, the invention is applicable to any radio communication apparatus in which a conductor surface of a casing or a substrate faces an antenna device.

In the above-described embodiment, the case in which the conductor components 36 are arranged in the conductor plate 21 and the conductor layer 34a has been described. However, according to other embodiments of the invention, the plurality of conductor components 36 may be arranged partially or the plurality of components 36 may be arranged on another conductor surface (not shown). For example, when a partial region of the first casing 10 facing the antenna device 40 is a conductor surface, the plurality of conductor components 36 may be arranged on this conductor surface in a repetitive manner.

In the above-described embodiment, the entirety of the region at which the plurality of conductor components 36 are arranged is the left-handed metamaterial that has the characteristics of an electromagnetic band-gap, but the invention is not limited thereto. The entirety or part of the region at which the plurality of conductor components 36 are arranged may be a left-handed metamaterial that has no characteristics of an electromagnetic band-gap.

In the above-described embodiment, the substrates facing the antenna device 40 are three kinds of substrates: the first circuit substrate 14, the second circuit substrate 24, and the interconnect substrate 30. However, fewer or more substrates facing the antenna device 40 may be used. Further, the substrate facing the antenna device 40 may be any one of a rigid substrate and a flexible substrate, or may be a composite substrate of a rigid substrate and a flexible substrate.

Priority is claimed on Japanese Patent Application No. 2010-081456, filed on Mar. 31, 2010, the content of which is incorporated herein by reference.

The invention claimed is:

1. A radio communication apparatus, comprising:
a first casing accommodating an antenna device;
a second casing accommodating a flexible substrate which electrically connects components of the first casing to components of the second casing;
the first and second casings being slidably coupled to one another between first and second positions, the flexible substrate overlapping itself by different amounts when the cases are in the first and second positions, respectively;
the flexible substrate including a conductor surface and a plurality of conductor components electrically coupled to the conductor surface at respective spaced locations along the conductor surface, each conductor component having a reflective surface which does not extend perpendicular to the conductor surface at the location at which the conductor component is coupled to the conductor surface, the reflective surfaces facing the antenna device at least when the casings are in one of the first and second positions;
wherein the flexible substrate overlaps itself along an overlapping region and the antenna device faces the overlapping region when the casings are in the first position, and
wherein the plurality of conductor components are located at least in the overlapping region when the casings are in the first position.

2. The radio communication apparatus according to claim 1, wherein the first position corresponds to an open position and the second position corresponds to a closed position and the flexible substrate has a greater degree of overlap when the casings are in the first position than when they are in the second position.

3. The radio communication apparatus according to claim 1, wherein the plurality of conductor components form at least a part of a left-handed metamaterial.

4. The radio communication apparatus according to claim 3, wherein a region at which the plurality of conductor components are arranged reflects an electromagnetic wave of a communication frequency of the antenna device.

5. The radio communication apparatus according to claim 3, wherein the region at which the plurality of conductor components are arranged has characteristics of an electromagnetic band-gap and attenuates an electromagnetic wave of an operation frequency of the radio communication apparatus.

6. The radio communication apparatus according to claim 1,
wherein each of the conductor components includes:
a conductor element that faces the conductor surface outside the conductor surface,
an opening that is formed in the conductor surface,
a conductor piece that is formed in an island shape inside the opening, and
an interconnect that interconnects the conductor piece and the conductor surface, and
wherein the conductor piece and the interconnect are formed in the same layer as the conductor surface.

7. The radio communication apparatus according to claim 1,
wherein each of the conductor components includes:
a conductor element that faces the conductor surface outside the conductor surface,
an opening that is formed in the conductor surface, and
a line-shaped conductor line that is formed inside the opening and has an one end connected to the conductor surface and the other end which is an open end, and
wherein the conductor line is formed in the same layer as the conductor surface.

8. The radio communication apparatus according to claim 1,
wherein each of the conductor components includes:
a conductor element that faces the conductor surface,
a line-shaped conductor line that is formed in a different layer from the conductor surface, and
a connection member that connects one end of the line-shaped conductor line to the conductor surface.

9. The radio communication apparatus according to claim 8, wherein the conductor line is formed an intermediate layer between the conductor element and the conductor surface.

10. The radio communication apparatus according to claim 8,
wherein the conductor line is located on an opposite side of the conductor surface with the conductor element interposed therebetween, and
wherein the connection member is formed through the conductor element.

11. The radio communication apparatus according to claim 10, wherein the other end of the conductor line is an open end.

12. The radio communication apparatus according to claim 10, wherein the other end of the conductor line is short-circuited with the conductor element.

13. The radio communication apparatus of claim 1, wherein at least one component of the first casing is a first non-flexible substrate and at least one component of the second casing is a second non-flexible substrate and the flexible substrate electrically couples the non-flexible substrates to one another.

14. A radio communication apparatus, comprising:
a first casing accommodating an antenna device;
a second casing accommodating a flexible substrate which electrically connects components of the first casing to components of the second casing;
the first and second casings being slidably coupled to one another between first and second positions, the flexible substrate overlapping itself by different amounts when the cases are in the first and second positions, respectively;
the flexible substrate including a conductor surface and a plurality of conductor components electrically coupled to the conductor surface at respective spaced locations along the conductor surface, the conductor surface and the plurality of conductor components cooperating to act as a left-handed metamaterial, the metamaterial facing the antenna device at least when the casings are in one of the first and second positions;
wherein the flexible substrate overlaps itself along an overlapping region and the antenna device faces the overlapping region when the casings are in the first position, and
wherein the plurality of conductor components are located at least in the overlapping region when the casings are in the first position.

15. The radio communication apparatus of claim 14, wherein at least one component of the first casing is a first non-flexible substrate and at least one component of the second casing is a second non-flexible substrate and the flexible substrate electrically couples the non-flexible substrates to one another.

* * * * *